(12) United States Patent
Eide

(10) Patent No.: US 11,591,040 B2
(45) Date of Patent: Feb. 28, 2023

(54) FRONT WHEEL PIVOTING ASSEMBLY

(71) Applicant: Steven A. Eide, Phoenix, AZ (US)

(72) Inventor: Steven A. Eide, Phoenix, AZ (US)

( * ) Notice: Subject to any disclaimer, the term of this patent is extended or adjusted under 35 U.S.C. 154(b) by 98 days.

(21) Appl. No.: 17/329,947

(22) Filed: May 25, 2021

(65) Prior Publication Data
US 2022/0379994 A1 Dec. 1, 2022

(51) Int. Cl.
*B62K 21/22* (2006.01)
*B62K 25/16* (2006.01)

(52) U.S. Cl.
CPC .............. *B62K 25/16* (2013.01); *B62K 21/22* (2013.01); *B62K 2201/04* (2013.01)

(58) Field of Classification Search
CPC ...................................................... B62K 21/22
See application file for complete search history.

(56) References Cited

U.S. PATENT DOCUMENTS

| | | | |
|---|---|---|---|
| 4,162,797 A | 7/1979 | McBride | |
| D385,829 S | 11/1997 | Quick | |
| 5,772,227 A | 6/1998 | Michail | |
| 5,813,685 A | 9/1998 | LaRiviere | |
| 6,036,211 A | 3/2000 | Nohr | |
| 6,517,095 B1 | 2/2003 | Lansac | |
| 7,637,521 B2 * | 12/2009 | Grant | B62K 21/22 280/278 |
| 8,308,178 B2 | 11/2012 | Hoerdum | |
| 9,868,488 B2 * | 1/2018 | Hackl | B62K 21/22 |
| 10,518,837 B2 * | 12/2019 | Araki | B62K 25/04 |
| 10,549,808 B2 * | 2/2020 | Thompson | B62K 19/32 |

FOREIGN PATENT DOCUMENTS

WO      WO9533646      12/1995

* cited by examiner

*Primary Examiner* — Jacob D Knutson
*Assistant Examiner* — Hosam Shabara

(57) ABSTRACT

A front wheel pivoting assembly for a bicycle allowing for a front wheel of the bicycle to be articulated includes a bracket, a secondary head tube, a pivot unit, and a controller. The bracket and controller are mountable to an integral head tube and a handlebar, respectively, of a frame of a bicycle lacking a front fork assembly and a handlebar stem. Lower and upper ends of the secondary head tube engage the front fork assembly and the handlebar stem, respectively. A hinge is engaged to and extends between the bracket and the secondary head tube. The pivot unit is engaged to the bracket and is operationally engaged to the secondary head tube, allowing for reversible positioning of the secondary head tube. The controller selectively actuates the pivot unit, allowing a user to pull back and to push forward on the handlebar to extend and retract, respectively, the front wheel.

15 Claims, 7 Drawing Sheets

FRONT WHEEL PIVOTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pivoting assemblies and more particularly pertains to a new pivoting assembly for a bicycle allowing for a front wheel of the bicycle to be articulated relative to the frame. The present invention discloses a pivoting assembly that can be mounted to a frame of a bicycle so that the front wheel can be articulated relative to the frame.

(2) Description of Related Art Including Information Disclosed Under 37 CFR 1.97 and 1.98

The prior art relates to pivoting assemblies. Prior art pivoting assemblies may allow for articulation of two sections of a bicycle, including the front forks, but are integral to the bicycle and cannot be used to retrofit an existing bicycle. Additionally, articulation of the front wheel of prior art assemblies is generally in response to road surface interactions and is intended to provide a smooth rid. These prior art assemblies cannot be selectively actuated by a user to articulate the front wheel.

BRIEF SUMMARY OF THE INVENTION

An embodiment of the disclosure meets the needs presented above by generally comprising a bracket, a secondary head tube, a pivot unit, and a controller. The bracket is configured for engagement to an integral head tube of a frame of a bicycle, from which a front fork assembly and a handlebar stem have been removed, such the bracket is mounted to the frame.

The secondary head tube has a lower end and an upper end, which are configured to engage the front fork assembly and the handlebar stem, respectively. A hinge is engaged to and extends between the bracket and the secondary head tube. The hinge is positioned proximate to the upper end of the secondary head tube and a top of the bracket.

The pivot unit is engaged to the bracket and is operationally engaged to the secondary head tube. The pivot unit allows for reversible positioning of the secondary head tube in a first configuration and a second configuration. In the first configuration, the secondary head tube is substantially parallel to the integral head tube. In the second configuration, the secondary head tube is transverse to the integral head tube and a front wheel of the bicycle is articulated forwardly from the frame.

The controller is configured to be mountable to a handlebar of the bicycle and is operationally engaged to the pivot unit. The controller is positioned to selectively actuate the pivot unit, allowing a user to pull back on the handlebar to extend the front wheel and to push forward on the handlebar to retract the front wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
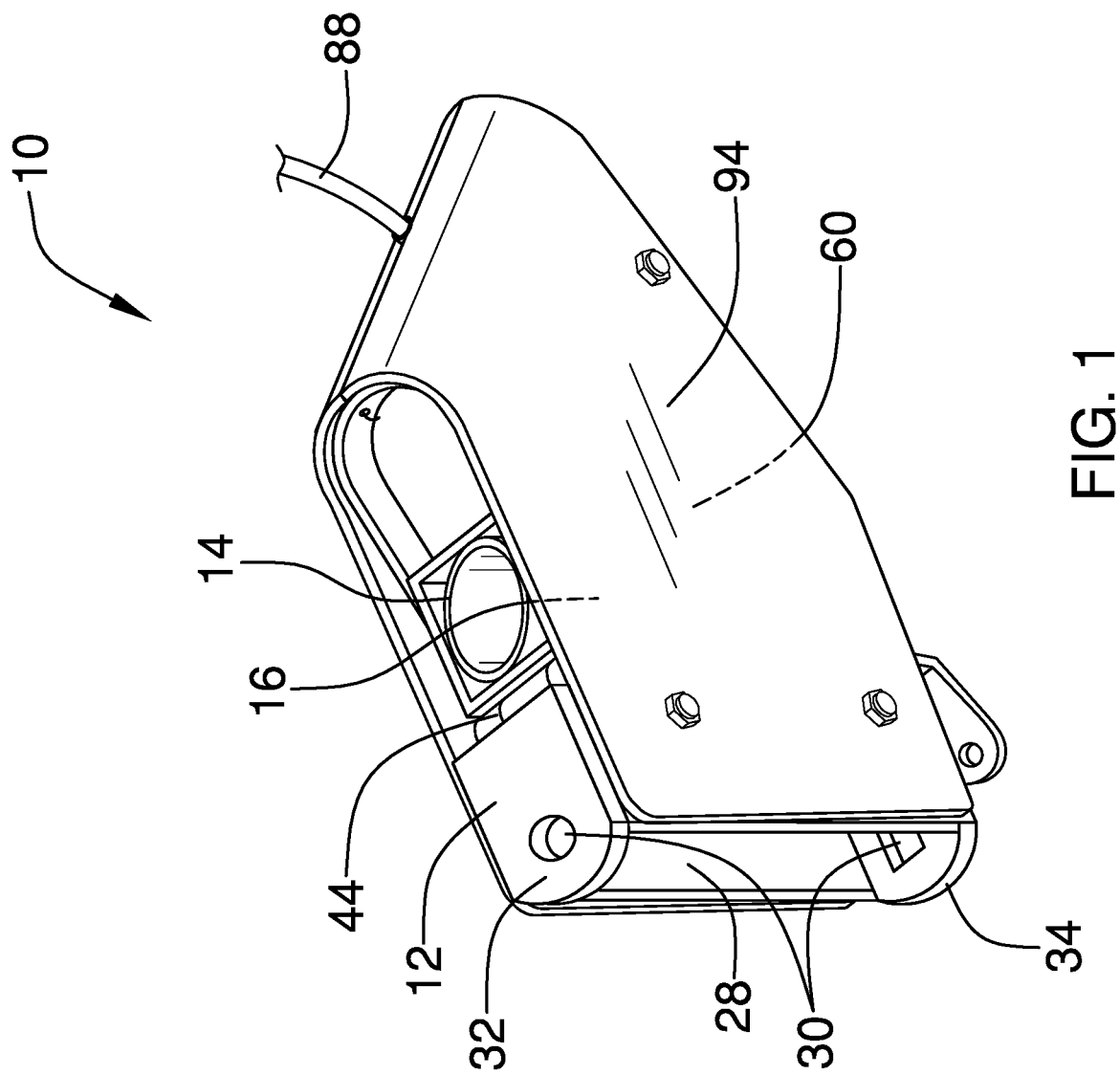
FIG. 1 is an isometric perspective view of a front wheel pivoting assembly according to an embodiment of the disclosure.

With reference now to the drawings, and in particular to FIGS. 1 through 7 thereof, a new pivoting assembly embodying the principles and concepts of an embodiment of the disclosure and generally designated by the reference numeral 10 will be described.

Figure 2:
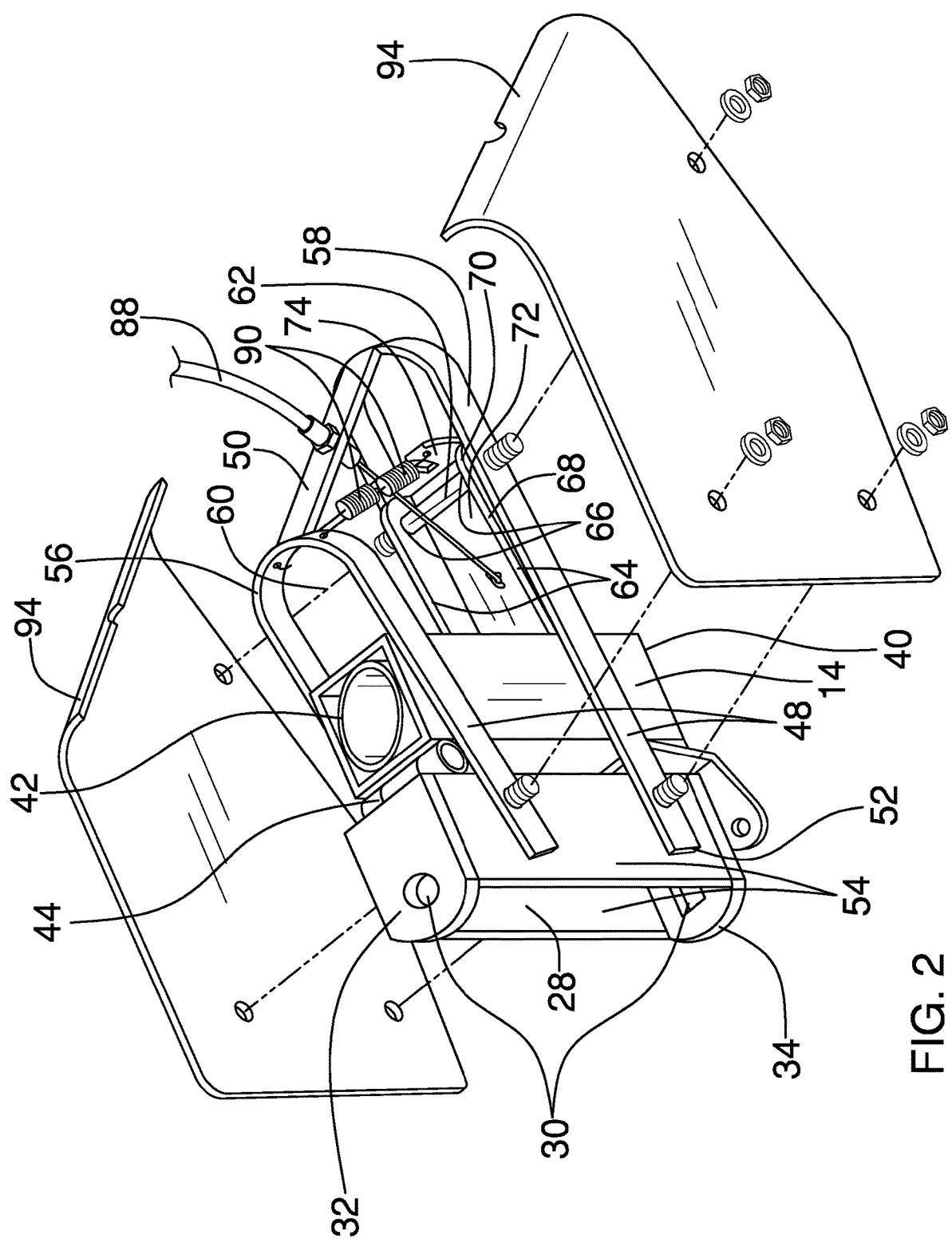
FIG. 2 is a detail view of an embodiment of the disclosure.
Figure 3:
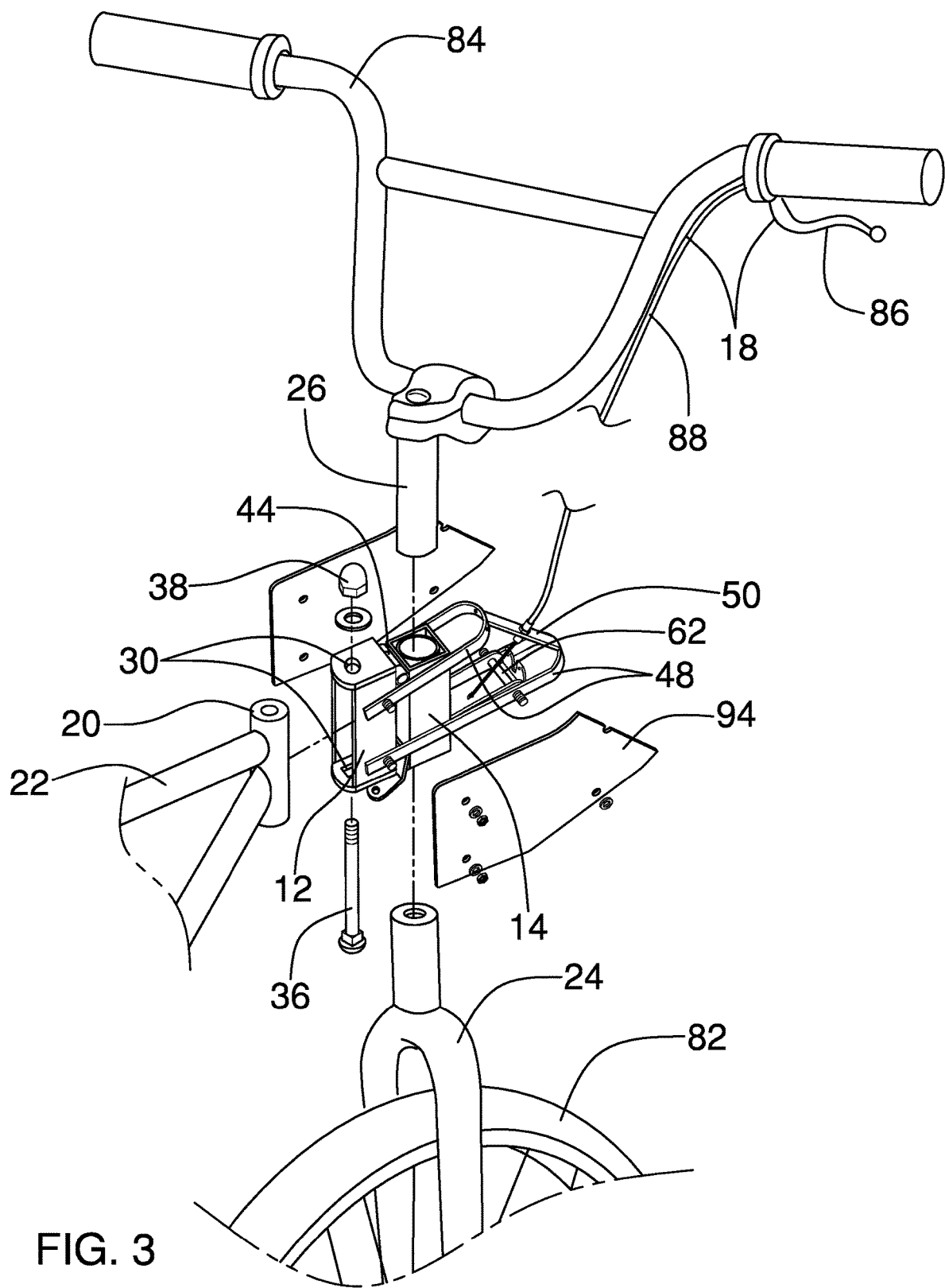
FIG. 3 is an exploded view of an embodiment of the disclosure.

As best illustrated in FIGS. 1 through 7, the front wheel pivoting assembly 10 generally comprises a bracket 12, a secondary head tube 14, a pivot unit 16, and a controller 18. The bracket 12 is configured for engagement to an integral head tube 20 of a frame 22 of a bicycle 46 from which a front fork assembly 24 and a handlebar stem 26 have been removed, such the bracket 12 is mounted to the frame 22. The bracket 12 may be elongated rectangularly box shaped, as is shown in FIG. 2.

The bracket 12 has a rear face 28, which is open. The integral head tube 20 can be inserted through the rear face 28 into the bracket 12. Apertures 30 of a pair of apertures 30 are positioned singly in a top 32 and a bottom 34 of the bracket 12. A carriage bolt 36 is configured for insertion through the integral head tube 20 and the pair of apertures 30, as is shown in FIG. 2, positioning the carriage bolt 36 for threadedly engaging a carriage nut 38 to mount the bracket 12 to the integral head tube 20.

The secondary head tube 14 has a lower end 40 and an upper end 42, which are configured to engage the front fork assembly 24 and the handlebar stem 26, respectively. A hinge 44 is engaged to and extends between the bracket 12 and the secondary head tube 14. The hinge 44 is positioned proximate to the upper end 42 of the secondary head tube 14 and the top 32 of the bracket 12. Present invention also anticipates a frame 22 lacking an integral head tube 20, with the secondary head tube 14 being hingedly engaged directly to the frame 22.

Figure 4:
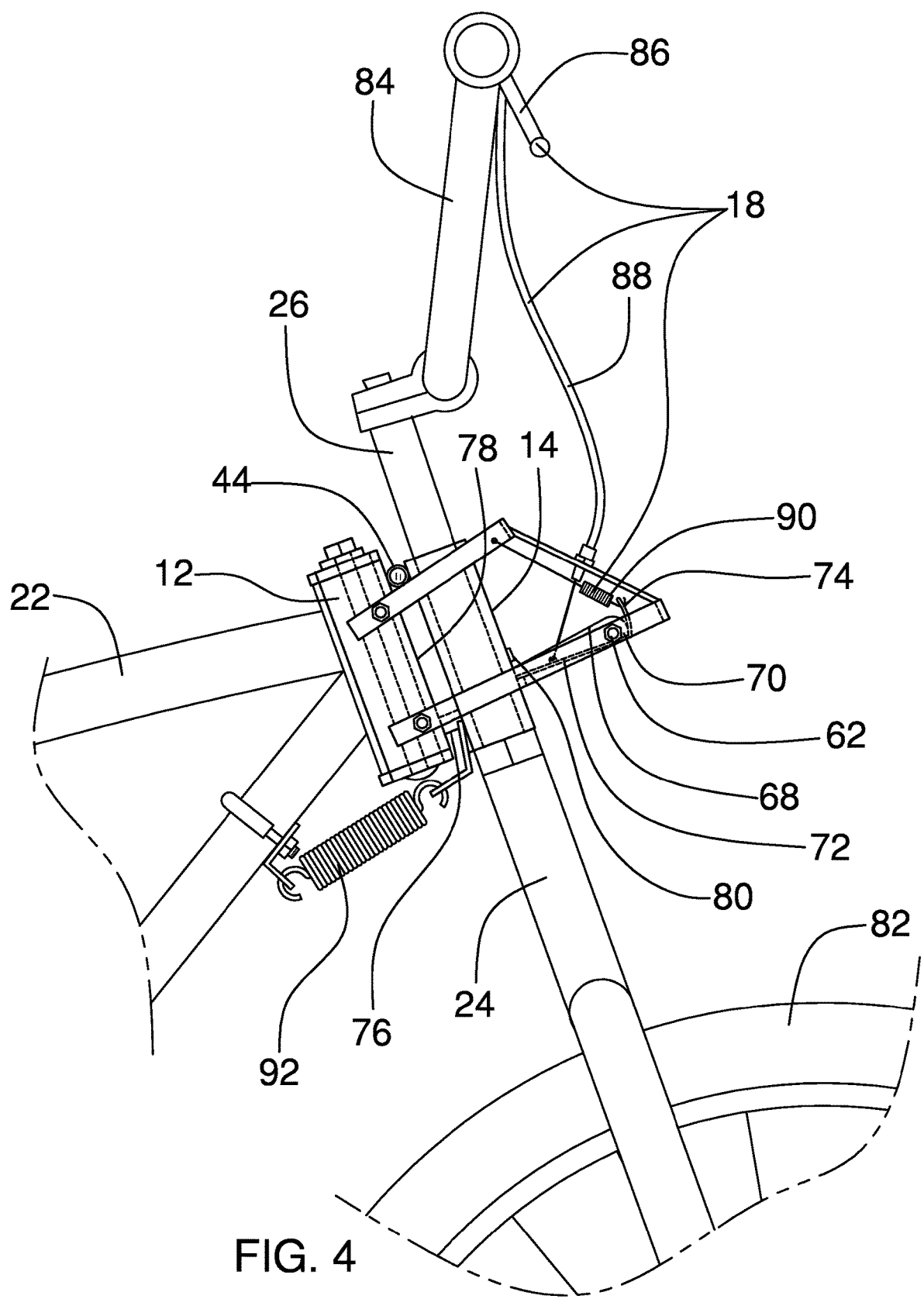
FIG. 4 is a side view of an embodiment of the disclosure in a first configuration.
Figure 5:
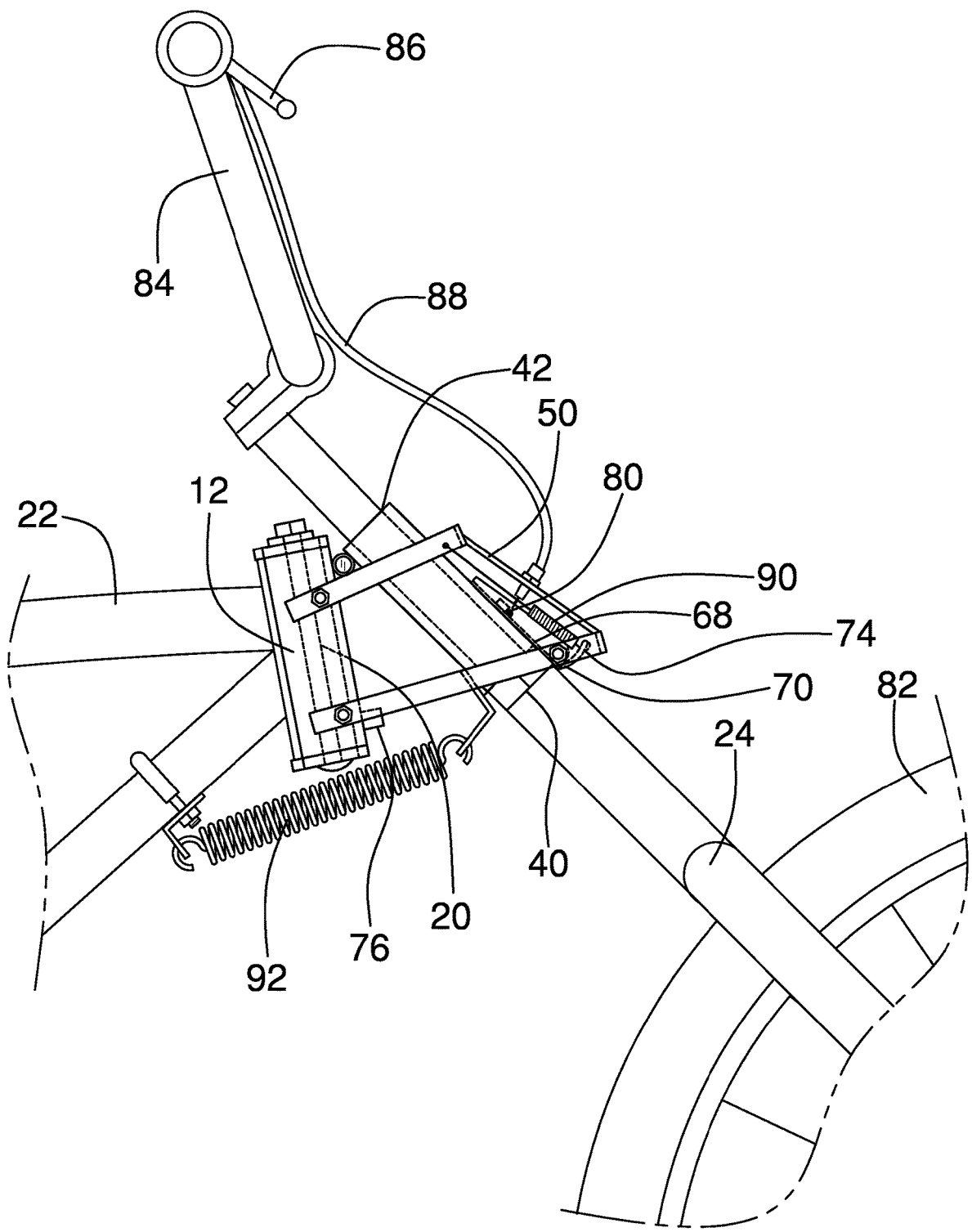
FIG. 5 is a side view of an embodiment of the disclosure in a second configuration.

The pivot unit 16 is engaged to the bracket 12 and is operationally engaged to the secondary head tube 14. The pivot unit 16 allows for reversible positioning of the secondary head tube 14 in a first configuration and a second configuration. In the first configuration, the secondary head tube 14 is substantially parallel to the integral head tube 20, as is shown in FIG. 4. In the second configuration, the secondary head tube 14 is transverse to the integral head tube 20 and a front wheel 82 of the bicycle 46 is articulated forwardly from the frame 22, as is shown in FIG. 5.

The pivot unit 16 comprises a pair of first bars 48 and a second bar 50. The first bars 48 are elongated U-shaped. Each opposed end 52 of a respective first bar 48 is engaged to a respective opposed side face 54 of the bracket 12 so that the first bar 48 brackets and extends past the secondary head tube 14. An upper one 56 of the first bars 48 is engaged to the bracket 12 proximate to the top 32 and a lower one 58 of the first bars 48 is engaged to the bracket 12 proximate to the bottom 34 of the bracket 12. The second bar 50 is engaged to and extends between the first bars 48 distal from the bracket 12. The second bar 50, the first bars 48, and the bracket 12 define a space 60.

The pivot unit 16 also comprises a shaft 62 and a pair of arms 64. The shaft 62 is positioned in the space 60 and is engaged to and extends between the lower one 58 of the first bars 48 proximate to the second bar 50. Each arm 64 is rotationally engaged to the shaft 62 proximate to a respective opposing end 66 of the shaft 62, defining a first segment 68 and a second segment 70 of the arm 64. The first segment 68 extends to and abuts the secondary head tube 14 in the first configuration. The second segment 70 extends toward the second bar 50.

A first plate 72 is engaged to and extends between the arms 64. The first plate 72 and the arms 64 are positioned for retaining the secondary head tube 14 in the first configuration. A second plate 74 is engaged to and extends arcuately from the first plate 72. The second segment 70 is arcuate distal from the first segment 68. The second plate 74 is engaged to each second segment 70 distal from an associated first segment 68.

A first rod 76 is engaged to and extends from a front face 78 of the bracket 12 proximate to the bottom 34 of the bracket 12. The first rod 76 is positioned to contact the secondary head tube 14 in the first configuration to maintain the secondary head tube 14 substantially parallel to the integral head tube 20.

A second rod 80 is engaged to and extends from the secondary head tube 14 proximate to the lower end 40. The second rod 80 is positioned to contact the first plate 72 in the second configuration to prevent the secondary head tube 14 from hinging past the shaft 62.

Figure 6:
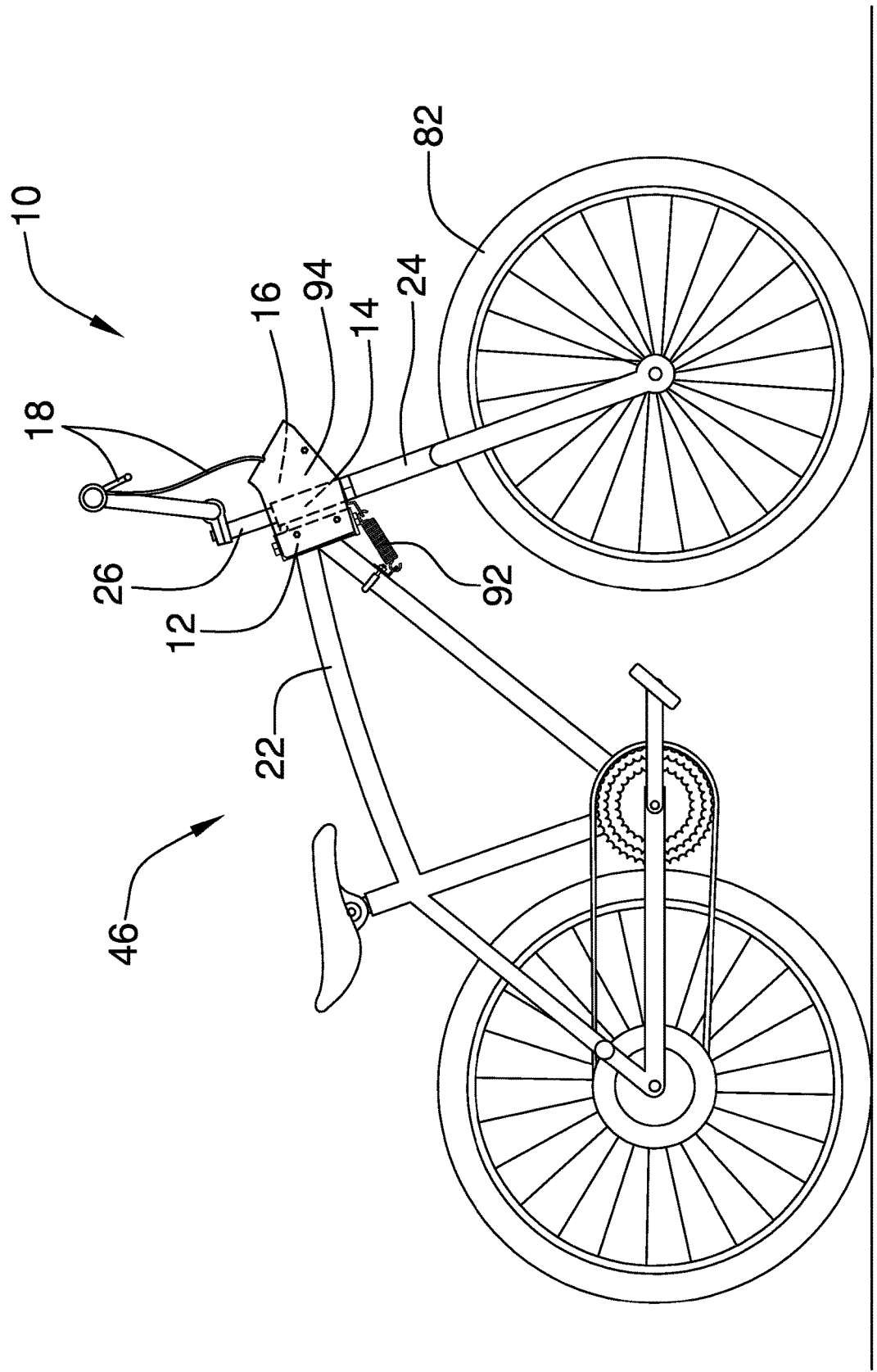
FIG. 6 is an in-use view of an embodiment of the disclosure in a first configuration.
Figure 7:
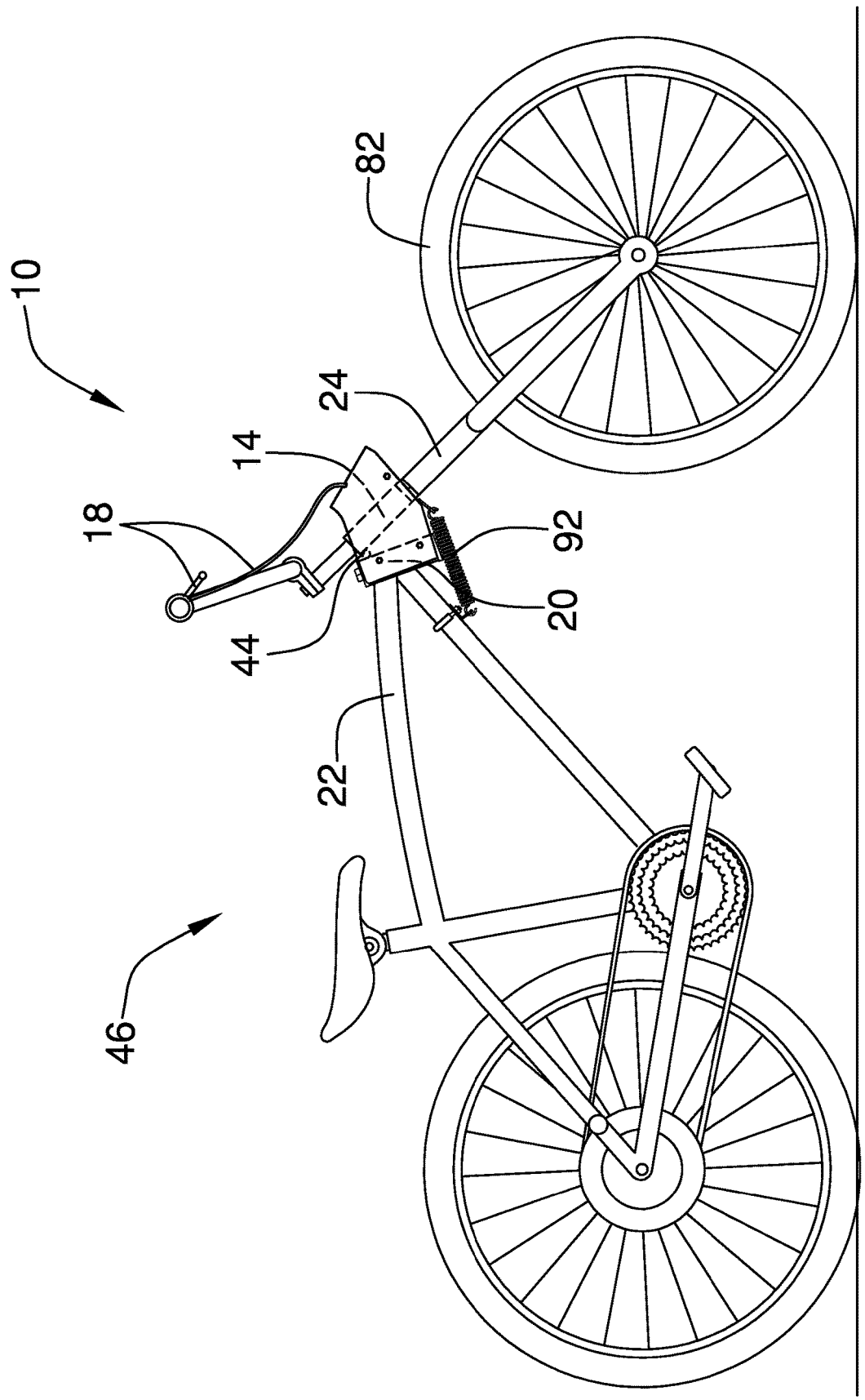
FIG. 7 is an in-use view of an embodiment of the disclosure in a second configuration.

The controller 18 is configured to be mountable to a handlebar 84 of the bicycle 46 and is operationally engaged to the pivot unit 16. The controller 18 is positioned to selectively actuate the pivot unit 16, allowing a user to pull back on the handlebar 84 to extend the front wheel 82, as is shown in FIG. 7, and to push forward on the handlebar 84 to retract the front wheel 82, as is shown in FIG. 6. The user can bounce the front wheel 82 by repeatedly pulling back and pushing forward on the handlebar 84.

The controller 18 comprises a lever 86, a cable 88, and a return spring 90. The cable 88 is engaged to and extends between the lever 86 and the first plate 72. The lever 86 is configured to be levered by tightening of a grasp of a hand of the user upon the lever 86 and the handlebar 84. The arms 64 and the first plate 72 are rotated relative to the shaft 62 and are disengaged from the secondary head tube 14 so that the secondary head tube 14 is free to move from the first configuration to the second configuration.

The return spring 90 is engaged to and extends between the second plate 74 and the upper one 56 of the first bars 48. The return spring 90 is tensioned concurrently with levering of the lever 86, positioning the return spring 90 to rebound upon release of the lever 86 to rotate the arms 64 and the first plate 72 to resecure the secondary head tube 14 in the first configuration. The return spring 90 may be one of a pair of return springs 90, as is shown in FIG. 2.

The upper one 56 of the first bars 48 is dimensionally shorter than the lower one 58 of the first bars 48 so that the second bar 50 is transverse to the bracket 12. The second bar 50 being transverse to the bracket 12 positions the cable 88, which passes through the second bar 50, to exert upward force on the first plate 72 upon levering of the lever 86.

A coiled spring 92 is engaged to the secondary head tube 14 and is configured to engage the frame 22 so that the coiled spring 92 extends between the secondary head tube 14 and the frame 22. The coiled spring 92 is engaged to the secondary head tube 14 proximate to the lower end 40. The coiled spring 92 is configured to be tensioned concurrently with the secondary head tube 14 moving from the first configuration to the second configuration, positioning the coiled spring 92 to facilitate return of the secondary head tube 14 to the first configuration.

The front wheel pivoting assembly 10 also may comprise a shroud 94, which is selectively engageable to the pair of arms 64 to substantially enclose the space 60. The shroud 94 is aesthetic and functions to prevent injury in that is deters insertion of objects, such as fingers, into the space 60.

In use, the bracket 12 and the controller 18 are mounted to the integral head tube 20 and the handlebar 84, respectively, of the bicycle 46. The front fork assembly 24 and the handlebar stem 26 are engaged to the lower end 40 and the upper end 42 of the secondary head tube 14, respectively. The user then can ride the bicycle 46 as normal, and, if desired, pull back and push forward on the handlebar 84 to extend and retract, respectively, the front wheel 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A front wheel pivoting assembly comprising:
   a bracket configured for engagement to an integral head tube of a frame of a bicycle from which a front fork assembly and a handlebar stem have been removed, such the bracket is mounted to the frame;
   a secondary head tube having a lower end configured for engaging the front fork assembly and an upper end configured for engaging the handlebar stem;
   a hinge engaged to and extending between the bracket and the secondary head tube, the hinge being positioned proximate to the upper end of the secondary head tube and a top of the bracket;
   a pivot unit engaged to the bracket and being operationally engaged to the secondary head tube, the pivot unit allowing for reversible positioning of the secondary head tube in a first configuration, wherein the secondary head tube is substantially parallel to the integral head tube, and a second configuration, wherein the secondary head tube is transverse to the integral head tube and a front wheel of the bicycle is articulated forwardly from the frame; and
   a controller configured to be mountable to a handlebar of the bicycle, the controller being operationally engaged to the pivot unit, such that the controller is positioned for selectively actuating the pivot unit, allowing a user to pull back on the handlebar to extend the front wheel and to push forward on the handlebar to retract the front wheel.

2. The front wheel pivoting assembly of claim 1, further including:
   the bracket being elongated rectangularly box shaped, the bracket having a rear face, the rear face being open, such that the integral head tube can be inserted through the rear face into the bracket;
   a pair of apertures positioned singly in the top and a bottom of the bracket; and
   a carriage bolt and a carriage nut, wherein the carriage bolt is configured for insertion through the integral head tube and the pair of apertures, positioning the carriage bolt for threadedly engaging the carriage nut for mounting the bracket to the integral head tube.

3. The front wheel pivoting assembly of claim 1, wherein: the pivot unit comprises:
   a pair of first bars, the first bars being elongated U-shaped, each opposed end of a respective first bar being engaged to a respective opposed side face of the bracket, such that the first bar brackets and extends past the secondary head tube, an upper one of the first bars being engaged to the bracket proximate to the top and a lower one of the first bars being engaged to the bracket proximate to a bottom of the bracket,
   a second bar engaged to and extending between the first bars distal from the bracket, such that the second bar, the first bars, and the bracket define a space,
   a shaft positioned in the space and being engaged to and extending between the lower one of the first bars proximate to the second bar,
   a pair of arms, each arm being rotationally engaged to the shaft proximate to a respective opposing end of the shaft, defining a first segment and a second segment of the arm, the first segment extending to and abutting the secondary head tube in the first configuration, the second segment extending toward the second bar, the second segment being arcuate distal from the first segment,
   a first plate engaged to and extending between the arms, such that the first plate and the arms are positioned for retaining the secondary head tube in the first configuration, and
   a second plate engaged to and extending arcuately from the first plate, the second plate being engaged to each second segment distal from an associated first segment; and
   the controller comprises:
   a lever,
   a cable engaged to and extending between the lever and the first plate, wherein the lever is configured for being levered by tightening of a grasp of a hand of the user upon the lever and the handlebar, such that the arms and the first plate are rotated relative to the shaft and disengaged from the secondary head tube, such that the secondary head tube is free to move from the first configuration to the second configuration, and
   a return spring engaged to and extending between the second plate and the upper one of the first bars, such that the return spring is tensioned concurrently with levering of the lever, positioning the return spring for rebounding upon release of the lever for rotating the arms and the first plate, for securing the secondary head tube in the first configuration.

4. The front wheel pivoting assembly of claim 3, wherein the upper one of the first bars is dimensionally shorter than the lower one of the first bars, such that the second bar is transverse to the bracket.

5. The front wheel pivoting assembly of claim 1, further including a coiled spring engaged to the secondary head tube and being configured to engaged the frame, such that the coiled spring extends between the secondary head tube and the frame, the coiled spring being engaged to the secondary head tube proximate to the lower end, wherein the coiled spring is configured for tensioning concurrently with the secondary head tube moving from the first configuration to the second configuration, positioning the coiled spring for facilitating return of the secondary head tube to the first configuration.

6. The front wheel pivoting assembly of claim 3, further including a shroud selectively engageable to the pair of arms for substantially enclosing the space.

7. The front wheel pivoting assembly of claim 3, further including:
   a first rod engaged to and extending from a front face of the bracket proximate to a bottom of the bracket, such that the first rod is positioned for contacting the secondary head tube in the first configuration for maintaining the secondary head tube substantially parallel to the integral head tube; and a second rod engaged to and extending from the secondary head tube proximate to the lower end, such that the second rod is positioned for contacting the first plate in the second configuration for preventing the secondary head tube from hinging past the shaft.

8. A front wheel pivoting system comprising:
a bicycle comprising a frame from which a front fork assembly and a handlebar stem have been removed;
a bracket engaged to an integral head tube of the frame, such the bracket is mounted to the frame;
a secondary head tube having a lower end engaged to the front fork assembly and an upper end engaged to the handlebar stem;
a hinge engaged to and extending between the bracket and the secondary head tube, the hinge being positioned proximate to the upper end of the secondary head tube and a top of the bracket;
a pivot unit engaged to the bracket and being operationally engaged to the secondary head tube, the pivot unit allowing for reversible positioning of the secondary head tube in a first configuration, wherein the secondary head tube is substantially parallel to the integral head tube, and a second configuration, wherein the secondary head tube is transverse to the integral head tube and a front wheel of the bicycle is articulated forwardly from the frame; and
a controller mounted to a handlebar of the bicycle, the controller being operationally engaged to the pivot unit, such that the controller is positioned for selectively actuating the pivot unit, allowing a user to pull back on the handlebar to extend the front wheel and to push forward on the handlebar to retract the front wheel.

9. The front wheel pivoting system of claim 8, further including:
the bracket being elongated rectangularly box shaped, the bracket having a rear face, the rear face being open, the integral head tube being inserted through the rear face into the bracket;
a pair of apertures positioned singly in the top and a bottom of the bracket; and
a carriage bolt and a carriage nut, the carriage bolt being inserted through the integral head tube and the pair of apertures, the carriage bolt being threadedly engaged to the carriage nut, such that the bracket is mounted to the integral head tube.

10. The front wheel pivoting system of claim 8, wherein:
the pivot unit comprises:
a pair of first bars, the first bars being elongated U-shaped, each opposed end of a respective first bar being engaged to a respective opposed side face of the bracket, such that the first bar brackets and extends past the secondary head tube, an upper one of the first bars being engaged to the bracket proximate to the top and a lower one of the first bars being engaged to the bracket proximate to a bottom of the bracket,
a second bar engaged to and extending between the first bars distal from the bracket, such that the second bar, the first bars, and the bracket define a space,
a shaft positioned in the space and being engaged to and extending between the lower one of the first bars proximate to the second bar, a pair of arms, each arm being rotationally engaged to the shaft proximate to a respective opposing end of the shaft, defining a first segment and a second segment of the arm, the first segment extending to and abutting the secondary head tube in the first configuration, the second segment extending toward the second bar, the second segment being arcuate distal from the first segment,
a first plate engaged to and extending between the arms, such that the first plate and the arms are positioned for retaining the secondary head tube in the first configuration, and
a second plate engaged to and extending arcuately from the first plate, the second plate being engaged to each second segment distal from an associated first segment; and
the controller comprises:
a lever,
a cable engaged to and extending between the lever and the first plate, wherein the lever is configured for being levered by tightening of a grasp of a hand of the user upon the lever and the handlebar, such that the arms and the first plate are rotated relative to the shaft and disengaged from the secondary head tube, such that the secondary head tube is free to move from the first configuration to the second configuration, and
a return spring engaged to and extending between the second plate and the upper one of the first bars, such that the return spring is tensioned concurrently with levering of the lever, positioning the return spring for rebounding upon release of the lever for rotating the arms and the first plate, for securing the secondary head tube in the first configuration.

11. The front wheel pivoting system of claim 10, wherein the upper one of the first bars is dimensionally shorter than the lower one of the first bars, such that the second bar is transverse to the bracket.

12. The front wheel pivoting system of claim 8, further including a coiled spring engaged to the secondary head tube and being configured to engaged the frame, such that the coiled spring extends between the secondary head tube and the frame, the coiled spring being engaged to the secondary head tube proximate to the lower end, such that the coiled spring is tensioned concurrently with the secondary head tube moving from the first configuration to the second configuration, positioning the coiled spring for facilitating return of the secondary head tube to the first configuration.

13. The front wheel pivoting system of claim 10, further including a shroud engaged to the pair of arms for substantially enclosing the space.

14. The front wheel pivoting system of claim 10, further including:
a first rod engaged to and extending from a front face of the bracket proximate to a bottom of the bracket, such that the first rod is positioned for contacting the secondary head tube in the first configuration for maintaining the secondary head tube substantially parallel to the integral head tube; and
a second rod engaged to and extending from the secondary head tube proximate to the lower end, such that the second rod is positioned for contacting the first plate in the second configuration for preventing the secondary head tube from hinging past the shaft.

15. A front wheel pivoting assembly comprising:
a bracket configured for engagement to an integral head tube of a frame of a bicycle from which a front fork assembly and a handlebar stem have been removed, such the bracket is mounted to the frame, the bracket being elongated rectangularly box shaped, the bracket having a rear face, the rear face being open, such that the integral head tube can be inserted through the rear face into the bracket;

a pair of apertures positioned singly in a top and a bottom of the bracket;

a carriage bolt and a carriage nut, wherein the carriage bolt is configured for insertion through the integral head tube and the pair of apertures, positioning the carriage bolt for threadedly engaging the carriage nut for mounting the bracket to the integral head tube;

a secondary head tube having a lower end configured for engaging the front fork assembly and an upper end configured for engaging the handlebar stem;

a hinge engaged to and extending between the bracket and the secondary head tube, the hinge being positioned proximate to the upper end of the secondary head tube and the top of the bracket;

a pivot unit engaged to the bracket and being operationally engaged to the secondary head tube, the pivot unit allowing for reversible positioning of the secondary head tube in a first configuration, wherein the secondary head tube is substantially parallel to the integral head tube, and a second configuration, wherein the secondary head tube is transverse to the integral head tube and a front wheel of the bicycle is articulated forwardly from the frame, the pivot unit comprising:

a pair of first bars, the first bars being elongated U-shaped, each opposed end of a respective first bar being engaged to a respective opposed side face of the bracket, such that the first bar brackets and extends past the secondary head tube, an upper one of the first bars being engaged to the bracket proximate to the top and a lower one of the first bars being engaged to the bracket proximate to the bottom of the bracket, a second bar engaged to and extending between the first bars distal from the bracket, such that the second bar, the first bars, and the bracket define a space, the upper one of the first bars being dimensionally shorter than the lower one of the first bars, such that the second bar is transverse to the bracket, a shaft positioned in the space and being engaged to and extending between the lower one of the first bars proximate to the second bar, a pair of arms, each arm being rotationally engaged to the shaft proximate to a respective opposing end of the shaft, defining a first segment and a second segment of the arm, the first segment extending to and abutting the secondary head tube in the first configuration, the second segment extending toward the second bar, the second segment being arcuate, the second segment being arcuate distal from the first segment, a first plate engaged to and extending between the arms, such that the first plate and the arms are positioned for retaining the secondary head tube in the first configuration, and a second plate engaged to and extending arcuately from the first plate, the second plate being engaged to each second segment distal from an associated first segment;

a first rod engaged to and extending from a front face of the bracket proximate to the bottom of the bracket, such that the first rod is positioned for contacting the secondary head tube in the first configuration for maintaining the secondary head tube substantially parallel to the integral head tube;

a second rod engaged to and extending from the secondary head tube proximate to the lower end, such that the second rod is positioned for contacting the first plate in the second configuration for preventing the secondary head tube from hinging past the shaft;

a controller configured to be mountable to a handlebar of the bicycle, the controller being operationally engaged to the pivot unit, such that the controller is positioned for selectively actuating the pivot unit, allowing a user to pull back on the handlebar to extend the front wheel and to push forward on the handlebar to retract the front wheel, the controller comprising:

a lever, a cable engaged to and extending between the lever and the first plate, wherein the lever is configured for being levered by tightening of a grasp of a hand of the user upon the lever and the handlebar, such that the arms and the first plate are rotated relative to the shaft and disengaged from the secondary head tube, such that the secondary head tube is free to move from the first configuration to the second configuration, and a return spring engaged to and extending between the second plate and the upper one of the first bars, such that the return spring is tensioned concurrently with levering of the lever, positioning the return spring for rebounding upon release of the lever for rotating the arms and the first plate, for securing the secondary head tube in the first configuration;

a coiled spring engaged to the secondary head tube and being configured to engaged the frame, such that the coiled spring extends between the secondary head tube and the frame, the coiled spring being engaged to the secondary head tube proximate to the lower end, wherein the coiled spring is configured for tensioning concurrently with the secondary head tube moving from the first configuration to the second configuration, positioning the coiled spring for facilitating return of the secondary head tube to the first configuration; and a shroud selectively engageable to the pair of arms for substantially enclosing the space.

* * * * *